United States Patent Office 3,449,299
Patented June 10, 1969

3,449,299
MANUFACTURE OF HIGHLY TRANSPARENT SHEETS FROM AMORPHOUS POLYAMIDES
Johannes Schneider and Wolfgang Pungs, Troisdorf, Germany, assignors to Dynamit Nobel Aktiengesellschaft, Troisdorf, Germany, a corporation of Germany
No Drawing Filed June 29, 1966, Ser. No. 561,412
Claims priority, application Germany, July 1, 1965, D 47,628
Int. Cl. C08g 53/16, 20/20
U.S. Cl. 260—78                                     10 Claims

ABSTRACT OF THE DISCLOSURE

Sheets and foils on the basis of amorphous polyamides having increased strengths, low water absorptions, reduced permeability to water vapor, improved electrical properties and transparency by extrusion of polyamides having viscosity values ranging from 94 to 160 prepared from mixtures of terephthalic acid methyl esters, isophthalic acid methyl esters and hexanemethylenediamines from suitable extrusion units at temperatures which increase in the direction moving toward the nozzle from at least 200 to at the most 315° C.

---

The sheets and foils are particularly suitable for packaging, laminating and insulating applications.

This invention relates to the manufacture of highly transparent sheets from amorphous polyamides and more particularly to the production of new materials having valuable and characteristic properties that make them especially suitable for use in industry, for example, in packaging, laminating, and insulating applications and for other purposes.

Sheets and foils prepared from polyamides on a basis of ε-caprolactam or sebacic acid, 11-aminoundecanoic acid, adipic acid and diamines as, for instance, from products available under the tradenames nylon 6, nylon 6, 6, nylon 6, 10, and nylon 6, 11, are known. Their production is, however, difficult to effect due to their relatively sharp and pronounced melting points and because of the thin liquid nature of their melts. Further, as a result of the more or less crystalline character of the resulting sheets and foils, in the case of sheet thicknesses of more than 0.2 mm., marked opaqueness or cloudiness is observed, this opaqueness and cloudiness appearing also but to a lesser degree in sheets and foils having a thickness of less than 0.2 mm.

The primary object of this invention is to improve generally the manufacture of sheets and foils from amorphous polyamides, more particularly to provide a method of manufacture, wherein transparent sheets and foils on the basis of amorphous polyamides are obtained.

Another object of this invention is to provide sheets and foils on the basis of amorphous polyamides having valuable and characteristic properties that make them especially suitable for use in industry, for example, in packaging, laminating, and insulating applications and for other purposes.

These and other more detailed objects will be apparent from the disclosure which follows:

In accordance with the invention, it has now been found that sheets and foils characterized by increased strength, low water absorptions, reduced permeability to water vapor, superior electrical properties and superior transparency can be produced even in thicknesses exceeding 0.2 mm. from amorphous polyamides by using polyamides having viscosity values ranging from 94 to 160 prepared from mixtures of terephthalic acid methyl esters, isophthalic acid methyl esters and hexamethylenediamines by extrusion from suitable extrusion units at temperatures which increase in the direction moving toward the extrusion die from at least 200 to, at the most, 315° C.

The above-mentioned esters are intended to include both neutral esters and acid esters. Hexamethylenediamines within the meaning of the present invention include hexamethylenediamine, 2,2,4-trimethylhexamethylenediamine, 2,4,4-trimethylhexamethylenediamine, as well as mixtures of any or all of the components just indicated. If mixtures of isophthalic acid and terephthalic acid methyl esters are used for preparing the polyamides, then weight ratios of between 60:40 and 90:10 and preferably a weight ratio of 70:30 are to be employed.

In carrying the present invention into effect, the following conditions and details are preferably observed:

In the case of a polyamide having none or less than 1.5 mol percent of N-methyl groups produced by side reactions referred to the total N, if the blown tubing-extrusion method is being utilized, then a polyamide product having a viscosity value of 90 to 112 must be used. If the polyamide contains from 1.5 to 2 mol percent N-methyl groups, then polyamide products having viscosity values of 130 to 140 are employed in the blowing. When a polyamide having less than 1.5 mol percent, if any of N-methyl groups is used in connection with a flat sheet mold followed by winding, then there is employed a polyamide product having a viscosity value ranging from 110 to 116. In the case of a polyamide containing 1.5 to 2 mol percent N-methyl groups in the flat sheet mold followed by winding operation, there is employed a polyamide having a viscosity value of 140 to 155.

There can also be employed as the polyamide product herein a mixture of polyamides having different viscosity values lying within the limits just indicated.

The sheets or foils produced by the method of the present invention have valuable properties and especially favorable mechanical properties that make them suitable for use in industry, for example, for packaging purposes, particularly in connection with the packaging of foodstuffs, and because of their excellent electrical properties they are suitable for use as insulating materials, lamination with other sheet materials, for instance, those prepared on a basis of polyvinyl and polyvinylidene halides and their copolymers, polyethylene, polypropylene, and even metals is possible. Furthermore, the physical properties of the sheets can be improved by a biaxial stretching within the temperature ranging from 150–160° C.

The sheets having a thickness of 0.008μ can be produced by the method of the present invention.

The polyamides used in the process of this invention are prepared, for instance, in accordance with U.S. application Ser. No. 490,078, utilizing a precondensate stage followed by polycondensation, the precondensation being effected by heating the starting materials with addition of water, at normal pressure to 90 to 100° C.

The methanol-water mixture is substantially distilled off at normal pressure and the distillation residue can either be first of all polycondensed under pressure with subsequent reduction of pressure or else can be completely polycondensed under normal pressure at temperatures between 250 and 290° C. The precondensate is formed by stirring a substantially equimolar mixture of the aromatic dicarboxylic acid esters with the corresponding diamine in the presence of water at preferably 90 to 95° C., in which connection, in view of the solubility of the precondensate in water, at least 45 parts by weight of water per 100 parts by weight of methyl dicarboxylate must be used. In this case, one may operate either under reflux or with simultaneous distilling off of the methanol which is split off in the reaction. As soon as the quantity of methyl ester groups in the starting material taken as 100% dropped to the desired value, preferably to or below 10%, the water which may possibly still contain methanol is removed by distillation. If the residue solidifies as a result, the distillation is interrupted before the complete removal of the water and the mass is heated in a closed reaction vessel to above the melting point of the precondensate whereupon its pressure is gradually reduced to normal pressure and it is finally condensed. In many cases, however, the temperature can also be increased continuously to the final value without interrupting the distillation. N-methyl groups may be produced by side reactions. The amorphous polyamides prepared by this polycondensation method from the aforesaid starting materials have a melting range of 190 to 220° C. and can be worked in the range of the indicated viscosity values (the viscosity numbers were determined in accordance with DIN 53,727 on the granulate and using an 0.5% solution in m-cresol at a temperature of 25° C.) into blown and flat sheets, using in this regard for instance a Reifenhauser R60 extruder having two-zone (compression 1:2) and three-zone screws (compression 1:3) or a short compression screw (compression 1:3) in the temperature range between 200 and 315° C.

In order that those skilled in the art may understand better how the present invention may be carried into effect, the following examples are given by way of illustration and not by way of limitation:

EXAMPLE 1

An amorphous polyamide produced from dimethylphthalate and 2,2,4-trimethylhexamethylenediamine and having a viscosity value of 98 was blown into a sheet using a Reifenhauser R60 screw extruder by means of a two-zone screw (compression 1:2, screw thread-depth ratio 9:4.5), three-zone screw (compression 1:3, screw thread-depth ratio 10:3,3) or a short-compression screw (compression 1:3) and a blowhead (diameter 120 mm., circular slot 0.5 mm.) at the following temperatures (cylinder temperatures, ° C.: 220, 240, 260, 265, 265, mold temperature, ° C.: 260). The speed of rotation of the screw was 15 r.p.m. and a current consumption of 13 amperes. The characteristics and properties of the blown sheet produced from the polyamide as above described under the indicated conditions are set out in Table 1, which follows.

Table 1

Thickness of sheet, mm. _____ 0.02
Tensile strength:
　Lengthwise, kg./cm.$^2$ _____ 740
　Transverse, kg./cm.$^2$ _____ 760
Folding strength:
　Lengthwise, DIN 53,359 _____ >50,000
　Transverse, DIN 53,359 _____ >50,000
Rupturing strength, DIN 53,481, kv./cm. _____ 1230
Spec. resistance, DN 53,482, Ω-cm. _____ 1×10$^{15}$
Permeability to water vapor, DIN 53,122, g./m.$^2$/day _____ 13

EXAMPLE 2

An amorphous polyamide produced from dimethylterephthalate and 2,4,4-trimethylhexamethylenediamine and having a viscosity value of 94 was blown into a sheet at the following temperatures using the apparatus described in Example 1. The cylinder temperature, ° C., amounted to 220, 240, 250, 265, 265, and the mold temperature, ° C., to 260. The speed of rotation of the screw was 17 r.p.m. and the current consumption to 15 amperes. The blown sheet which was produced under these conditions from the indicated polyamide had the properties set forth in Table 2.

Table 2

Thickness of sheet, mm. _____ 0.02
Tensile strength:
　Lengthwise, kg./cm.$^2$ _____ 730
　Transverse, kg./cm.$^2$ _____ 710
Folding strength:
　Lengthwise, DIN 53,359 _____ >50,000
　Transverse, DIN 53,359 _____ >50,000
Rupturing strength, DIN 53,481, kv./cm. _____ 1230
Spec. resistance, DIN 53,482, Ω-cm. _____ 1×10$^{15}$
Permeability to water vapor, DIN 53,122, g./m.$^2$/day _____ 13

EXAMPLE 3

An amorphous polyamide produced from dimethylterephthalate and an isomeric mixture of 2,2,4- and 2,4,4-trimethylhexamethylenediamine and having a viscosity value of 94 was blown into a sheet at the following temperatures in the apparatus described in Example 1. Cylinder temperatures, ° C.: 220, 245, 260, 265, 265; mold temperature, ° C.: 260. The speed of rotation of the screw was 18 r.p.m. and the current consumption was 15 amperes. The blown sheet produced under these conditions from the aforesaid polyamide had the properties as set forth in Table 3.

Table 3

Thickness of sheet, mm. _____ 0.02
Tensile strength:
　Lengthwise, kg./cm.$^2$ _____ 710
　Transverse, kg./cm.$^2$ _____ 690
Folding strength:
　Lengthwise, DIN 53,359 _____ >50,000
　Transverse, DIN 53,359 _____ >50,000
Rupturing strength, DIN 53,481, kv./cm. _____ 1220
Spec. resistance, DIN 53,482, Ω-cm. _____ 1×10$^{15}$
Permeability to water vapor, DIN 52,122, g./m.$^2$/day _____ 13

EXAMPLE 4

An amorphous polyamide obtained from dimethylterephthalate and an isomeric mixture of 2,2,4-and 2,4,4-trimethylhexamethylenediamine and composed of a mixture of 20 to 50% by weight of polyamide having a viscosity value of 103 and 80 to 40% by weight of polyamide having a viscosity value of 112 was blown into a sheet at the following temperatures using apparatus described in Example 1. The cylinder temperatures in ° C. used were 240, 265, 270, 275, 280 and the mold temperature, ° C., was 270. The speed of rotation of the screw was 20 r.p.m. and the current consumption came to 13.8 amperes. The blown sheet produced from the polyamide mixture described and under the conditions set out herein had the properties set forth in Table 4.

Table 4

Thickness of sheet, mm. _____ 0.015
Tensile strength:
　Lengthwise, kg./cm.$^2$ _____ 960
　Transverse, kg./cm.$^2$ _____ 1000
Folding strength:
　Lengthwise, DIN 53,359 _____ >50,000
　Transverse, DIN 53,359 _____ >50,000
Rupturing strength, DIN 53,481, kv./cm. ____ 1530
Spec. resistance, DIN 53,482, Ω-cm. _____ 1×10$^{15}$
Permeability to water vapor, DIN 53,122, g./m.$^2$/day _____ 10

EXAMPLE 5

An amorphous polyamide (contatining 1.5-2% N-methyl groups) obtained from dimethylterephthalate and an isomeric mixture of 2,2,4- and 2,4,4-trimethylhexamethylenediamine having a viscosity value of 135 was blown into a sheet on the apparatus described in Example 1 at the following temperatures: (Cylinder temperature, ° C.: 220, 255, 265, 280, 300; tool temperature, ° C.: 290). The speed of rotation of the screw was 18 r.p.m., and the current consumption was 16 amperes. The blown sheet produced under these conditions from the polyamide set out above had the properties set forth in Table 5.

Table 5

| | |
|---|---|
| Thickness of sheet, mm. | 0.02 |
| Tensile strength: | |
|    Lengthwise, kg./cm.$^2$ | 800 |
|    Transverse, kg./cm.$^2$ | 760 |
| Folding strength: | |
|    Lengthwise, DIN 53,359 | >50,000 |
|    Transverse, DIN 53,359 | >50,000 |
| Rupturing strength, DIN 53,481, kv./cm. | 1370 |

EXAMPLE 6

An amorphous polyamide (containing 1.5–2% N-methyl groups) obtained from monomethylterephthalate and 2,2,4-trimethylhexamethylenediamine and having a viscosity value of 140 was blown into a sheet on the apparatus described in Example 1 at the following temperatures (cylinder temperatures, °C.: 240, 290, 315, 315, 310; tool temperature, °C.: 280). The speed of rotation of the screw was 17 r.p.m. and the current consumption was 16 amperes. The blown sheet produced from this polyamide under these conditions had the properties set forth in Table 6.

Table 6

| | |
|---|---|
| Thickness of sheet, mm. | 0.02 |
| Tensile strength: | |
|    Lengthwise, kg./cm.$^2$ | 790 |
|    Transverse, kg./cm.$^2$ | 770 |
| Folding strength: | |
|    Lengthwise, DIN 53,359 | >50,000 |
|    Transverse, DIN 53,359 | >50,000 |
| Rupturing strength, DIN 53,481, kv./cm. | 1510 |
| Spec. resistance DIN 53,482, Ω-cm. | 1×10$^{15}$ |
| Permeability to water vapor, DIN 53,122, g./m.$^2$/day | 12 |

EXAMPLE 7

An amorphous polyamide obtained from dimethylterephthalate and an isomeric mixture of 2,2,4-trimethylhexamethylenediamine and 2,4,4-trimethylhexamethylenediamine having a viscosity value of 116 was extruded to form a flat sheet using an R60 screw extruder by means of a two-zone screw (compression 1:3, screwthread-depth ratio 10:3.3) or a short compression screw (compression 1:3) and a 600 mm. wide sheet mold provided with a take-up roller at the following temperatures (cylinder temperatures, °C.: 220, 270, 300, 305, 290; mold temperature, °C.: 260. Temperature of the takeup rolls, °C.: 150). The speed of rotation of the screw was 16 r.p.m. and the current consumption was 15.2 amperes. The flat sheet produced under these conditions from this polyamide had the properties set forth in Table 7.

Table 7

| | |
|---|---|
| Thickness of sheet, mm. | 0.20 |
| Tensile strength: | |
|    Lengthwise, kg./cm$^2$ | 695 |
|    Transverse, kg./cm.$^2$ | 660 |
| Rupturing strength, DIN 53,481, kv./cm. | 740 |
| Spec. resistance, DIN 53,482, Ω-cm. | 1×10$^{15}$ |

EXAMPLE 8

An amorphous polyamide produced from dimethylterephthalate and an isomeric mixture of 2,2,4-trimethylhexamethylenediamine and 2,4,4-trimethylhexamethylenediamine having a viscosity value of 110 was extruded to form a flat sheet on the apparatus described in Example 7 at the following temperatures (cylinder temperatures, °C.: 220, 265, 295, 290, 280; mold temperature, °C.: 260). The speed of rotation of the screw was 16 r.p.m. and the current consumption was 15 amperes. The blown sheet produced from the described polyamide under these conditions had the properties set forth in Table 8.

Table 8

| | |
|---|---|
| Thickness of sheet, mm. | 0.19 |
| Tensile strength: | |
|    Lengthwise, kg./cm.$^2$ | 685 |
|    Transverse, kg./cm.$^2$ | 675 |
| Rupturing strength, DIN, 53,481, kv./cm. | 745 |
| Spec. resistance, DIN 53,482, Ω-cm. | 1×10$^{15}$ |

EXAMPLE 9

An amorphous polyamide prepared from 75% by weight dimethylisophthalate and 25% by weight dimethylterephthalate and hexamethylenediamine having a viscosity value of 110 was worked into a flat sheet on the apparatus described in Example 7 at the following temperatures (cylinder temperatures, °C.: 225, 250, 250, 260, 270; mold temperature, °C.: 260). The speed of rotation of the screw amounted to 10 r.p.m. and the current consumption was 15.6 amperes. The flat sheet produced under these conditions from the said polyamide had the properties set forth in Table 9, which follows:

Table 9

| | |
|---|---|
| Thickness of sheet, mm. | 0.20 |
| Tensile strength: | |
|    Lengthwise, kg./cm.$^2$ | 660 |
|    Transverse, kg./cm.$^2$ | 640 |
| Rupturing strength, DIN 53,481, kv./cm. | 730 |
| Spec. resistance, DIN 53,482, Ω-cm. | 1×10$^{15}$ |

EXAMPLE 10

An amorphous polyamide (containing 1.5–2% N-methyl groups prepared from dimethylterephthalate and an isomeric mixture of 2,2,4-trimethylhexamethylenediamine and 2,4,4-trimethylhexamethylenediamine having a viscosity value of 140 was extruded to form a flat sheet using therefor the apparatus described in Example 7 at the following temperatures (cylinder temperatures, °C.: 220, 265, 400, 290; flat-sheet mold, °C.: 285). The speed of rotation of the screw was 16 r.p.m. and the current consumption was 17 amperes. The flat sheet produced under indicated conditions from this polyamide had the properties which are set forth in Table 10:

Table 10

| | |
|---|---|
| Thickness of sheet, mm. | 0.20 |
| Tensile strength: | |
|    Lengthwise, kg./cm.$^2$ | 760 |
|    Transverse, kg./cm.$^2$ | 740 |
| Rupturing strength, DIN 53,481, kv./cm. | 735 |
| Spec. resistance, DIN 53,482, Ω-cm. | 1×10$^{15}$ |

EXAMPLE 11

An amorphous polyamide (containing 1.5–2% N-methyl groups) prepared from dimethylterephthalate and an isomeric mixture of 2,2,4-trimethylhexamethylenediamine and 2,4,4-trimethylhexamethylenediamine and having a viscosity value of 148 was extruded using the apparatus described in Example 7 at the following temperatures (cylinder temperatures, °C.: 220, 270, 290, 310, 300; mold temperature, °C.: 280) to form a flat sheet. The flat sheet produced under these conditions from the said polyamide had the properties set forth in Table 11.

Table 11

| | |
|---|---|
| Thickness of sheet, mm. | 0.20 |
| Tensile strength: | |
|    Lengthwise, kg./cm.$^2$ | 770 |
|    Transverse, kg./cm.$^2$ | 745 |
| Rupturing strength, DIN 53,481, kv./cm. | 720 |
| Spec. resistance, DIN 53,482, Ω-cm. | 1×10$^{15}$ |

The procedures which have been set out in Examples 7 to 11 can also be carried out in such a manner that the still highly viscous polyamide emerging from the flat-sheet mold is stretched in a longitudinal direction in the melt. In this manner there are obtained thinner sheets having thicknesses of up to 0.008 mm.

We claim:
1. Process for the manufacture of highly transparent sheets from amorphous polyamides, which comprises forming a sheet by extruding a polyamide having a viscosity value of from 94 to 160 prepared by condensation of a member of the group consisting of terephthalic acid methyl ester and isophthalic acid methyl ester with a member selected from the group consisting of hexamethylenediamine, 2,2,4-trimethylhexamethylenediamine, 2,4,4-trimethylhexamethylenediamine and mixtures thereof from an extrusion unit which includes an extrusion nozzle, and regulating the temperature in said extrusion unit so as to increase in the direction moving toward the nozzle from at least 200 to at the most 315° C.

2. Process according to claim 1, which comprises utilizing a polyamide containing up to 1.5 mol percent of N-methyl groups referred to the total N having a viscosity value of 94 to 112 to form a blown sheet.

3. Process according to claim 1, which comprises utilizing a polyamide containing from 1.5 to 2 mol percent of N-methyl groups referred to the total N having a viscosity value of 130 to 140 to form a blown sheet.

4. Process according to claim 1, which comprises utilizing a polyamide containing up to 1.5 mol percent of N-methyl groups referred to the total N having a viscosity value of 110 to 116 to form a blown sheet.

5. Process according to claim 1, which comprises utilizing a polyamide containing from 1.5 to 2 mol percent of N-methyl groups referred to the total N having a viscosity value of 140 to 155 to form a blown sheet.

6. Process according to claim 1, which comprises utilizing a mixture of polyamides each having a viscosity value of 94 to 160 to form a blown sheet.

7. Process according to claim 1, wherein an amorphous polyamide is produced from dimethylterephthalate and 2,2,4-trimethylhexamethylenediamine.

8. Process according to claim 1, wherein an amorphous polyamide is produced from dimethylterephthalate and an isomeric mixture of 2,2,4- and 2,4,4-trimethylhexamethylenediamine.

9. Process according to claim 1, wherein said amorphous polyamide is produced from a mixture of isophthalic acid and terephthalic acid methyl esters in a weight ratio of between 60:40 and 90:10.

10. A transparent sheet on the basis of an amorphous polyamide having a viscosity value of from 94 to 160 prepared by polycondensation of a member selected from the group consisting of terephthalic acid methyl ester and isophthalic acid methyl ester with a member selected from the group consisting of hexamethylenediamine, 2,2,4-trimethylhexamethylenediamine, 2,4,4-trimethylhexamethylenediamine and mixtures thereof formed by the process of claim 1.

References Cited

UNITED STATES PATENTS

| | | | |
|---|---|---|---|
| 3,009,208 | 11/1961 | Pirot | 264—95 |
| 3,198,771 | 8/1965 | Gabler | 260—78 |
| 3,294,758 | 12/1966 | Gabler | 260—78 |
| 3,379,695 | 4/1968 | Wolfes | 260—78 |
| 3,382,216 | 5/1968 | Blaschve et al. | 260—78 |

ROBERT F. WHITE, Primary Examiner.

JEFFERY R. THURLOW, Assistant Examiner.

U.S. Cl. X.R.

264—95, 176